Patented June 5, 1951

2,555,605

UNITED STATES PATENT OFFICE 2,555,605

PROCESS FOR PRODUCING MIXED CONDENSATION PRODUCTS

Rotheus B. Porter, Jr., Darien, Conn., assignor to American Cyanamid Company, New York, N. Y., a corporation of Maine No Drawing. Application March 4, 1948, Serial No. 13,092

6 Claims. (Cl. 260—6)

This invention relates to water insoluble thermosetting resins. More particularly, this invention relates to emulsions of water insoluble aniline-cresol modified thermosetting aminotriazine-aldehyde resins.

This invention is particularly directed to a process for preparing a resinous emulsion which may be utilized in emulsion form, or which may be conveniently spray dried to yield a molding composition comprising a mixed resin. In the prior art processes for the preparation of aminotriazine-aldehyde resins modified with aniline and cresol resins, the procedures involve the steps wherein separate resins must be produced, dried, ground and blended before the compositions of this type suitable for molding are obtained. According to the teachings of this invention, these steps are eliminated and one convenient operation is provided in lieu thereof. Among the advantages of the process of this invention, one of the primary advantages is that it is applicable to water insoluble modified thermosetting aminotriazine-aldehyde resins, and particularly a melamine-formaldehyde resin modified with cresol and aniline resins. Another particular advantage of this invention is that the process permits the formation of mixed resinous molding compositions by a single step emulsion polymerizing followed by direct spray drying.

Stated generally, the process consists of the formation of the resinous material in the presence of a dispersing or emulsifying agent followed by spray drying the resultant emulsion. The particular class of dispersing or emulsifying agents which are suitable in practicing this invention are the protective colloids such as alkali caseinates. The alkali metal salts, preferably sodium salts of the sulfate mono-esters of the higher fatty alcohol or mixtures thereof, particularly mixtures of the lauryl and myristyl derivatives, may be employed as secondary surface active agents, or the sulfonated alcohols may be satisfactorily used. A preferred embodiment of the invention comprises charging an aminotriazine and excess aldehyde with cresol to a suitable reaction vessel, and permitting reaction to the point of hydrophobe. Thereafter the dispersion or emulsifying agent and aniline are added accompanied by mechanical agitation. The resultant emulsion may then be employed in the form of an emulsion, or spray dried to give a resultant molding composition.

In order to more fully describe certain embodiments of this invention, the following examples are given by way of illustration:

Example 1

| | Parts by weight |
|---|---|
| Melamine | 81.6 |
| 37% aqueous solution of formaldehyde | 133.6 |
| Cresol (resin grade) | 8.8 |
| Alkali caseinate | 12 |
| Surface active agent | 5 |
| Aniline | 22.4 |
| Water | 150 |

The melamine, aqueous solution of formaldehyde and cresol, were charged to a suitable reaction vessel and adjusted in pH to 7.5, after which it was heated at 90° C. for 30 minutes. The reaction mixture was then rapidly cooled to 20° C.

The alkali caseinate and sodium salts of sulfated monoesters of a mixture of lauryl and myristyl alcohols were dissolved in 150 parts of water and added to the cooled reaction mixture. The aniline was then slowly added, accompanied by rapid mechanical agitation. The emulsion obtained in this manner was suitable for using direct in treating cellulosic fibers or textile fabrics or for spray drying to yield finely divided solids suitable for direct compression molding.

The above experiments were repeated employing potassium caseinate and potassium oleate as emulsifying agents, and as mixtures with the sodium salts of sulfate monoesters of a mixture of lauric and myristic alcohols. The emulsions obtained in this manner are quite satisfactory, although of shorter stable emulsion duration than the previous examples.

Example 2

| | Parts by weight |
|---|---|
| Melamine | 1020 |
| 40% aqueous solution of formaldehyde | 1670 |
| Cresol (resin grade) | 109 |
| Aniline | 279 |
| Potassium caseinate | 185 |
| Surface active agent | 50 |
| Ammonium hydroxide | 15 |
| Water | 1240 |

The formaldehyde was first adjusted with potassium hydroxide to pH 8. The melamine, formaldehyde and cresol were then charged to a suitable reaction vessel and refluxed until a sample thereof formed a permanent cloud in water at 25° C. The reaction mixture was then rapidly cooled to room temperature, and the remaining materials with the exception of aniline, were then added to the reaction mixture accompanied by rapid mechanical agitation. The aniline was then slowly added to the reaction mixture, accompanied by mechanical agitation and allowed to remain in agitation for 2 hours. The resultant emulsion was then spray dried at 500° F. to yield a finely subdivided granular solid which is suitable for direct compression molding.

The amount of formaldehyde present in the initial reaction should be sufficient to react with the melamine to give the desired condensation product, that is 1.5-3.5 mols of formaldehyde per mol of melamine, as the case may be, it being preferred, however, to stay within the range of 2-3 mols of formaldehyde condensed per mol of melamine, and provide a molar excess equivalent to the mols of the modifying agents. The cresol and aniline react with the excess free formaldehyde and methylol groups present at initial hydrophobe point.

The modifying agents, the cresol and aniline, may be present in an amount of from about 20% to about 40% based on the total weight of melamine and resin modifying agent, it being preferred, however, that 30%-40% of the modifying agents be employed. The cresol employed is the resin grade and it is present in an amount of 25%-40% of the modifying agents, i. e., cresol and aniline combined.

The amount of protective colloid employed as emulsifying agent may vary within a fairly wide range. From a preferred and economic viewpoint, it has been found, however, that 5%-10% of protective colloid gives a satisfactory emulsion, the percentage of colloid being based on the weight of melamine employed in the reaction. If and when secondary and surface active agents are employed, an amount sufficient to assist or aid the emulsifying agent is all that need be used, although it is not essential that they be present. Optimum results are obtained when these agents are employed in an amount of approximately 30% of the weight of emulsifying agent.

I claim:

1. A process comprising condensing melamine, cresol and formaldehyde to hydrophobe point in an aqueous solution, forming an emulsion of the resultant reaction product with 5%-10% of an alkali caseinate based on the weight of melamine, and adding aniline thereto accompanied by mechanical agitation, said formaldehyde being present in an amount to provide 1.5-3.5 mols of formaldehyde per mol of melamine, said aniline and cresol constituting 20%-40% of the total weight of melamine, cresol and aniline combined, and said cresol being present in an amount of 25%-40% of the total weight of cresol and aniline.

2. A process comprising condensing melamine, cresol, and formaldehyde to the hydrophobe point, in an aqueous solution, forming an emulsion of the resultant reaction product with 5%-10% of potassium caseinate based on the weight of melamine and adding aniline thereto accompanied by mechanical agitation, said formaldehyde being present in an amount sufficient to provide 1.5-3.5 mols of formaldehyde per mol of melamine, said aniline and cresol constituting 20%-40% of the total weight of melamine, cresol and aniline combined and said cresol being present in an amount of 25-40% of the total weight of cresol and aniline.

3. A process comprising condensing melamine, cresol, and formaldehyde to the hydrophobe point, in an aqueous solution, forming an emulsion of the resultant reaction product with 5-10% of an alkali caseinate based on the weight of melamine, in the presence of an aqueous solution of a mixture of the alkali metal salts of sulfate monoesters of a mixture of lauryl and myristyl alcohols, and adding aniline thereto accompanied by mechanical agitation, said formaldehyde being present in an amount sufficient to provide 1.5-3.5 mols of formaldehyde per mol of melamine, said aniline and cresol constituting 20%-40% of the total weight of melamine, cresol and aniline combined and said cresol being present in an amount of 25-40% of the total weight of cresol and aniline.

4. A process comprising condensing melamine, cresol, and formaldehyde to the hydrophobe point, in an aqueous solution, forming an emulsion of the resultant reaction product with 5-10% of a potassium caseinate based on the weight of melamine in the presence of an aqueous solution of a mixture of the alkali metal salts of sulfate monesters of a mixture of lauryl and myristyl alcohols, and adding aniline thereto accompanied by mechanical agitation, said formaldehyde being present in an amount sufficient to provide 1.5-3.5 mols of formaldehyde per mol of melamine, said aniline and cresol constituting 20%-40% of the total weight of melamine, cresol and aniline combined and said cresol being present in an amount of 25-40% of the total weight of cresol and aniline.

5. A process comprising condensing melamine, cresol and formaldehyde, to the hydrophobe point in an aqueous solution, forming an emulsion of the resultant reaction product with 5%-10% of an alkali caseinate based on the weight of melamine in the presence of a mixture of the sodium salts of sulfate monoesters of a mixture of lauryl and myristyl alcohols, and adding aniline thereto, accompanied by mechanical agitation, said formaldehyde being present in an amount sufficient to provide 1.5-3.5 mols of formaldehyde per mol of melamine, said aniline and cresol constituting 20-40% of the total weight of melamine, cresol, and aniline combined, and said cresol being present in an amount of 25-40% of the total weight of cresol and aniline.

6. A process comprising condensing melamine, cresol and formaldehyde, to the hydrophobe point in an aqueous solution, forming an emulsion of the resultant reaction product with 5%-10% of a potassium caseinate based on the weight of melamine in the presence of a mixture of the sodium salts of sulfate monoesters of a mixture of lauryl and myristyl alcohols, and adding aniline thereto, accompanied by mechanical agitation, said formaldehyde being present in an amount sufficient to provide 1.5-3.5 mols of formaldehyde per mol of melamine, said aniline and cresol constituting 20-40% of the total weight of melamine, cresol, and aniline combined, and said cresol being present in an amount of 25-40% of the total weight of cresol and aniline.

ROTHEUS B. PORTER, Jr.

REFERENCES CITED

The following references are of record in the file of this patent:

UNITED STATES PATENTS

| Number | Name | Date |
|---|---|---|
| 2,388,293 | Schroy et al. | Nov. 6, 1945 |

FOREIGN PATENTS

| Number | Country | Date |
|---|---|---|
| 502,720 | Great Britain | Mar. 23, 1939 |